(12) United States Patent
Chishima et al.

(10) Patent No.: US 10,877,355 B2
(45) Date of Patent: Dec. 29, 2020

(54) ACCESSORY AND IMAGE PICKUP APPARATUS

(71) Applicant: CANON KABUSHIKI KAISHA, Tokyo (JP)

(72) Inventors: Yuki Chishima, Yokohama (JP); Fumihiko Aikawa, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/429,404

(22) Filed: Jun. 3, 2019

(65) Prior Publication Data

US 2019/0377243 A1 Dec. 12, 2019

(30) Foreign Application Priority Data

Jun. 6, 2018 (JP) ................................. 2018-108221

(51) Int. Cl.
*G03B 17/14* (2006.01)
*H04N 5/225* (2006.01)
*G03B 17/56* (2006.01)
*H04N 17/00* (2006.01)
*H04N 5/232* (2006.01)

(52) U.S. Cl.
CPC ........... *G03B 17/14* (2013.01); *H04N 5/2252* (2013.01); *H04N 5/2253* (2013.01)

(58) Field of Classification Search
CPC .... G03B 17/14; G03B 17/566; H04N 5/2252; H01M 2/026
See application file for complete search history.

(56) References Cited

U.S. PATENT DOCUMENTS

| 2009/0184688 A1* | 7/2009 | Kim ........................ G06F 1/26 320/162 |
| 2012/0246350 A1* | 9/2012 | Lee ....................... H02J 7/0027 710/16 |

FOREIGN PATENT DOCUMENTS

JP 2015-075504 A 4/2015

* cited by examiner

*Primary Examiner* — Christopher K Peterson
(74) *Attorney, Agent, or Firm* — Cowan, Liebowitz & Latman, P.C.

(57) ABSTRACT

An accessory attachable to and detachable from an image pickup apparatus includes a first connector connectable to the image pickup apparatus, a second connector connectable to the image pickup apparatus, and an accessory controller configured to communicate with the image pickup apparatus. The accessory controller, in an initial setting after the accessory is attached to the image pickup apparatus, sends a first detection signal to the image pickup apparatus via the first connector and receives, in response to a second detection signal for detecting that the second connector is attached to the image pickup apparatus, a third detection signal from the image pickup apparatus via the second connector.

19 Claims, 5 Drawing Sheets

ACCESSORY AND IMAGE PICKUP APPARATUS

BACKGROUND OF THE INVENTION

Field of the Invention

The present invention relates to an accessory attachable to and detachable from an image pickup apparatus.

Description of the Related Art

A battery grip having a plurality of batteries has conventionally been known as an accessory attachable to an image pickup apparatus, such as a digital camera. When the battery grip is not normally attached to the image pickup apparatus, the image pickup apparatus may malfunction. Thus, for example, Japanese Patent Laid-Open No. ("JP") 2015-75504 discloses a camera that prevents an accessory attachment from being erroneously determined by devising a connector terminal arrangement in the accessory attachable to the camera.

As a variety of functions have recently been added to the battery grip, a battery grip having two connectors has been proposed. The battery grip having this configuration may not be normally attached to the image pickup apparatus. For example, one connector may be electrically connected but the other connector may not be electrically connected. In this state, the power for operating the image pickup apparatus is supplied from one connector, but the other connector is not normally connected. As a result, the communication processing is not normally performed between the image pickup apparatus and the battery grip, causing the malfunction.

Where each of the camera and the accessory has a single connector as disclosed in JP 2015-75504, the camera cannot avoid the malfunction caused by the erroneous determination of the accessory attachment having two connectors.

SUMMARY OF THE INVENTION

The present invention provides an accessory and an image pickup apparatus, each of which can avoid a malfunction where part of a plurality of connectors is not connected.

An accessory according to the present invention is attachable to and detachable from an image pickup apparatus. The accessory includes a first connector connectable to the image pickup apparatus, a second connector connectable to the image pickup apparatus, and an accessory controller configured to communicate with the image pickup apparatus. The accessory controller, in an initial setting after the accessory is attached to the image pickup apparatus, sends a first detection signal to the image pickup apparatus via the first connector and receives, in response to a second detection signal for detecting that the second connector is attached to the image pickup apparatus, a third detection signal from the image pickup apparatus via the second connector.

Further features of the present invention will become apparent from the following description of exemplary embodiments with reference to the attached drawings.

DESCRIPTION OF THE EMBODIMENTS

Referring now to the accompanying drawings, a description will be given of embodiments according to the present invention.

Figure 1A:
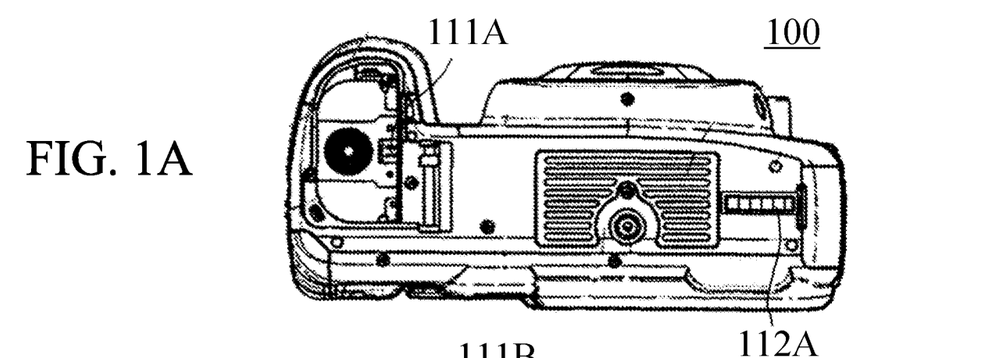
FIG. 1A to 1C are overviews of an image pickup apparatus and an accessory according to this embodiment.
Figure 1B:
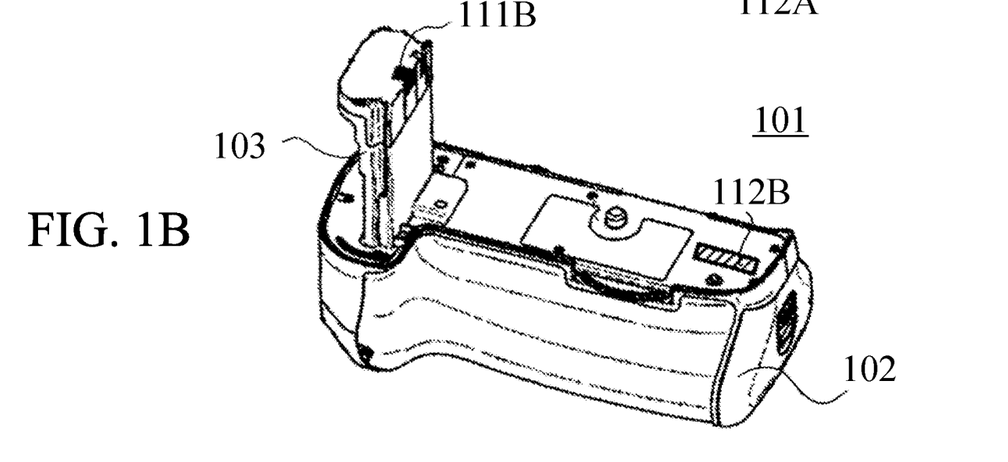
Figure 1C:
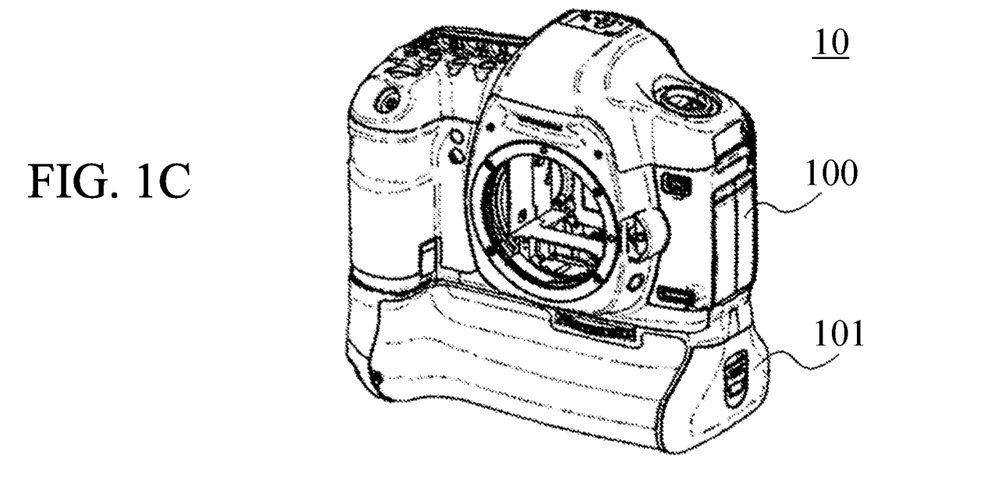

Referring now to FIGS. 1A to 1C, a description will be given of an overview configuration of a camera (image pickup apparatus) and a battery grip (accessory) according to this embodiment. FIGS. 1A-1C are external views of a camera (image pickup apparatus) 100 and a battery grip (accessory) 101. FIG. 1A illustrates a bottom view of the camera 100. FIG. 1B illustrates a perspective view of the battery grip 101. FIG. 1C illustrates a perspective view of a camera system (imaging system) 10 configured by attaching the battery grip 101 to the camera 100.

As illustrated in FIG. 1A, the camera 100 has a first connector 111A and a second connector 112A for communicating with the battery grip 101. As illustrated in FIG. 1B, the battery grip 101 has a first connector 111B and a second connector 112B for communicating with the camera 100. As illustrated in FIG. 1B, the battery grip 101 includes a body portion 102 and a protrusion portion (L-shaped upright portion) 103. The first connector 111B is provided onto the protrusion portion 103, and the second connector 112B is provided onto the body portion 102.

As illustrated in FIG. 1C, when the battery grip 101 is normally attached to the camera 100, the first connector 111A and the first connector 111B are electrically connected to each other, and the second connector 112A and the second connector 112B are electrically connected to each other. Thereby, a normal communication is performed between the camera 100 and the battery grip 101, and the camera 100 can perform a normal operation associated with the attachment of the battery grip 101.

The first connectors 111A and 111B are mainly used for the power application connection, and include power terminals for supplying the power from the battery grip 101 to the camera 100, grounded (GND) terminals, communication signal terminals, and the like. In driving a camera using a single battery without attaching the battery grip 101, the battery is generally inserted into the portion on the left side in FIG. 1A where the user holds the camera 100, and the battery is connected to the power supply terminal of the first connector 111A. Thus, the first connector 111B provided with the power supply terminal of the battery grip 101 may be provided onto the protrusion portion (L-shaped upright portion) 103 of the battery grip 101.

The battery grip 101 includes not only the first connector 111B of the protrusion portion 103 but also the second connector 112B of the body portion 102 because it needs a large number of signal terminals for a variety of functions. If a power supply terminal is provided in the second connector 112B of the body portion 102, it is not necessary to use two connectors (although the first connector 111B is unnecessary). However, the general camera 100 has a shape in which the battery is inserted inside the handheld part held by the user with his right hand. Hence, the power supply terminal of the battery grip 101 may be provided to the first connector 111B in order to avoid the power loss due to the different routing of the power supply line and the like.

The second connectors 112A and 112B are connectors for generally connecting the communication signal, operation button signals, and the like. Details of them will be described later with reference to FIG. 2.

Figure 2:
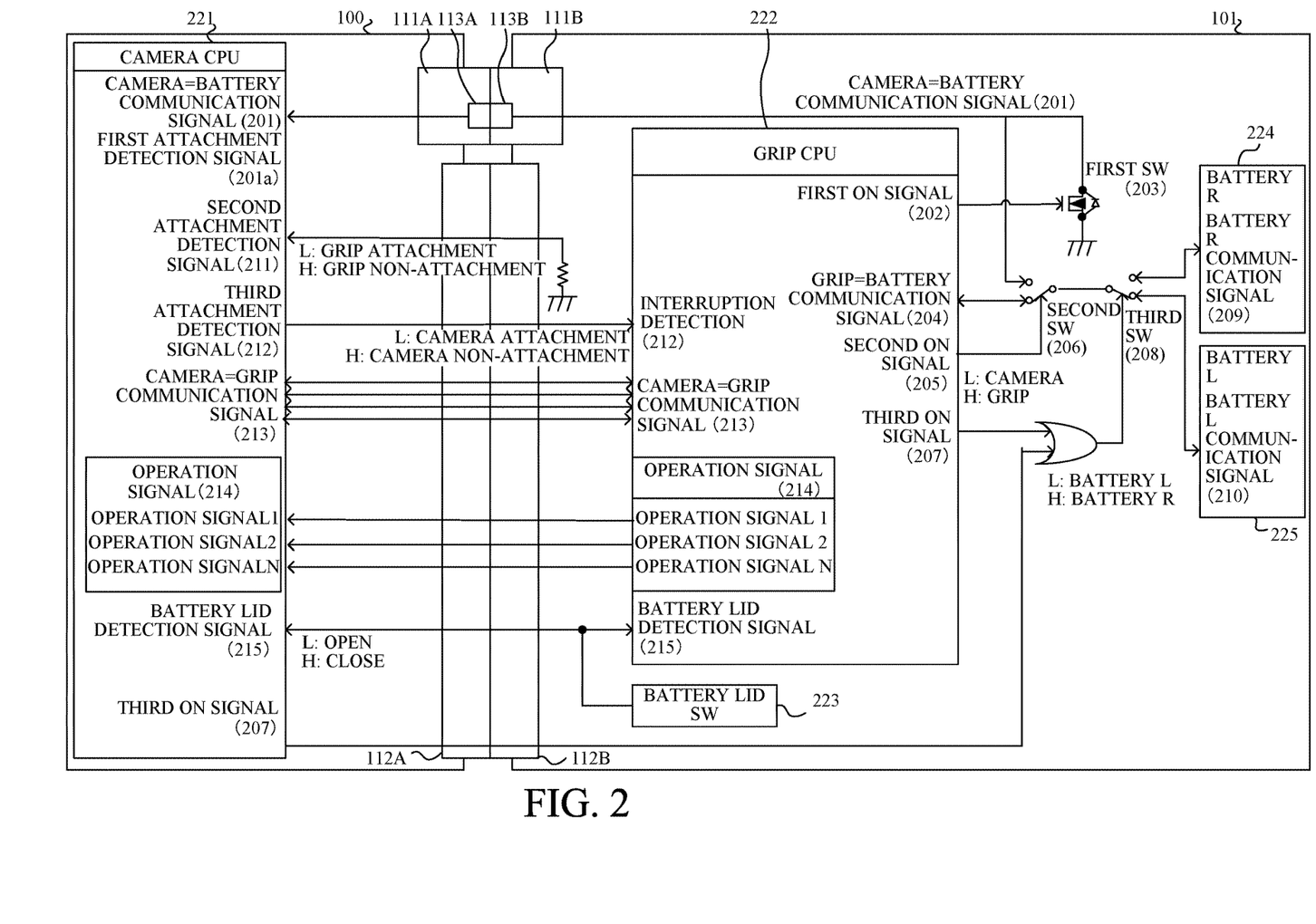
FIG. 2 is a block diagram of the image pickup apparatus and the accessory according to this embodiment.

Referring now to FIG. 2, a description will be given of a control system and signal processing of each of the camera 100 and the battery grip 101. FIG. 2 is a block diagram of the camera 100 and the battery grip 101.

The camera 100 includes a camera CPU (camera controller) 221 that controls each component in the camera 100. The battery grip 101 has a grip CPU (accessory controller) 222 that controls each component in the battery grip 101. The battery grip 101 can also store two batteries (batteries R 224 and L 225), and can supply the power to the camera 100 with the batteries R 224 and L 225. However, this embodiment is not limited to this example, and the battery grip 101 may store three or more batteries.

When the batteries R 224 and L 225 are inserted into a battery compartment in the battery grip 101 and the battery lid is closed (when the battery lid SW223 is turned on), a battery lid detection signal 215 becomes high (Hi or H), and the grip CPU 222 detects the closure of the battery lid. After the battery lid is closed, the grip CPU 222 starts the initialization (initial setting).

The batteries R 224 and L 225 communicate various information, such as remaining amount information of each battery and an abnormality notice, with the camera CPU 221 and the grip CPU 222, using a battery R communication signal 209 and a battery L communication signal 210, respectively. Whether the camera CPU 221 or the grip CPU 222 communicates with the battery R 224 or the battery L 225 is determined by switching a third SW 208 by a third ON signal 207. This embodiment sets the battery L 225 in the initialization (initial setting).

A second ON signal 205 and a second SW 206 switch the battery L communication signal 210 of the battery L 225 to the grip CPU 222 or the camera CPU 221. When the second ON signal 205 is high, this embodiment connects the battery L communication signal 210 to the grip CPU 222, and the battery L 225 communicates with the grip CPU 222 as an grip=battery communication signal (communication signal between the grip and the battery) 204. On the other hand, when the second ON signal 205 is low (L or Low), the battery L communication signal 210 is connected to the camera CPU 221, and the battery L 225 communicates with the camera CPU 221 as the camera=battery communication signal (communication signal between the camera and the battery) 201.

This embodiment sets the camera=battery communication signal 201 and the grip=battery communication signal 204 to high, in the initializations by the camera CPU 221 and the grip CPU 222. This embodiment enables the camera=battery communication signal 201 to be intentionally fixed to the low level from the normal state of the high level by a first ON signal 202 and a first SW 203. After the initialization of the grip CPU 222 is completed, the camera=battery communication signal 201 is fixed to the low level from normal state of the high state.

The camera=battery communication signal 201 is connected to the camera CPU 221 via the first connector 111B on the top of the battery grip 101 and the first connector 111A of the camera 100. In other words, the first connector 111A has a terminal 113A for communicating the camera=battery communication signal 201, and the second connector 111B has a terminal 113B for communicating the camera=battery communication signal 201.

The camera CPU 221 detects that the first connector 111B of the battery grip 101 is attached to the first connector 111A of the camera 100 when the camera=battery communication signal 201 is low. Thereby, this embodiment utilizes the camera=battery communication signal 201, which is usually used only for the communication, as a first attachment detection signal (first detection signal) 201a to determine the attachment between the first connectors 111A and 111B.

When the second connectors 112A and 112B are attached to each other after the first connectors 111A and 111B are attached to each other, a second attachment detection signal (second detection signal) 211 becomes low. Thereby, the camera CPU 221 can detect that the second connector 112A of the camera 100 and the second connector 112B provided on the body portion 102 of the battery grip 101 are attached to each other.

The camera CPU 221 outputs a third attachment detection signal (third detection signal) 212 to the grip CPU 222. When the first attachment detection signal 201 and the second attachment detection signal 211 are both low, the camera CPU 221 sets the third attachment detection signal 212 to the low level. When the grip CPU 222 interrupts and detects that the third attachment detection signal 212 in the low state, the grip CPU 222 detects that the battery grip 101 is normally attached to the camera 100. This is the contents of the control system and signal processing according to this embodiment.

As described above, the first attachment detection signal 201a (camera=battery communication signal 201) is communicated via the first connector 111A of the camera 100 and the first connector 111B of the battery grip 101. The second attachment detection signal 211 and the third attachment detection signal 212 are communicated via the second connector 112A of the camera 100 and the second connector 112B of the battery grip 101. Then, the camera CPU 221 and the grip CPU 222 process the first attachment detection signal 201a, the second attachment detection signal 211, and the third attachment detection signal 212. Thereby, the grip CPU 222 determines whether or not the battery grip 101 is normally attached to the camera 100 (or preforms the attachment determination).

After determining that the battery grip 101 is normally attached to the camera 100, the camera CPU 221 and the grip CPU 222 perform the communication processing by the camera=battery communication signal 201 via the terminals of the first connectors 111A and 111B. After it is determined that the battery grip 101 is normally attached to the camera 100, the camera CPU 221 and the grip CPU 222 perform the initial setting communication (initialization communication).

Figure 6A:
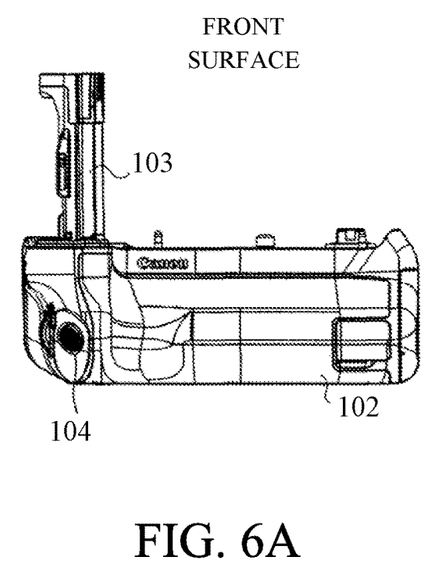
FIGS. 6A and 6B are overviews of a battery grip according to this embodiment.
Figure 6B:
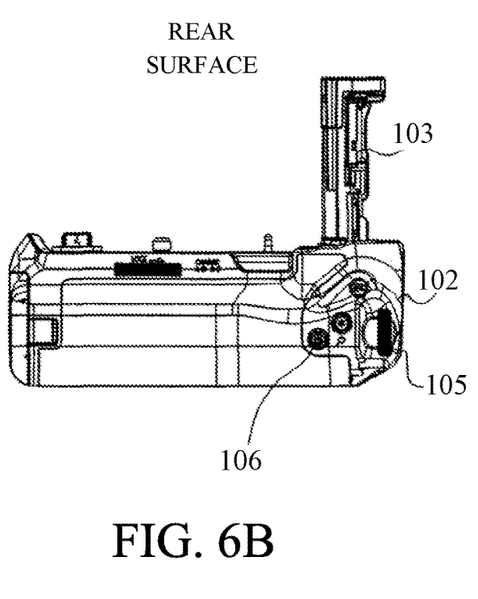

The battery grip 101 has not only a function of increasing the number of capturable images by the camera 100 using a plurality of batteries (battery R 224 and battery L 225) but also other functions. For example, the battery grip 101 has a plurality of operation units in the battery grip 101, and the camera 100 is operated by the operation signals 214 (operation signals 1, 2, . . . , N in FIG. 2) output via each operation unit. FIGS. 6A and 6B are overviews of the battery grip 101, FIG. 6A is a front view, and FIG. 6B is a rear view. As illustrated in FIGS. 6A and 6B, the battery grip 101 has, as operation buttons, a release button 104, a dial 105, and a button 106 used for an imaging assistance function. For normal operations of the camera 100 based on the operation signal 214 via each operation unit, the camera CPU 221 and the grip CPU 222 need to perform the initial setting communication.

This embodiment avoiding malfunctions that may occur when the first connector 111B of the protrusion portion 103 (L-shaped upright portion) is normally connected and the second connector 112B of the body portion 102 is not normally connected by obliquely inserting the battery grip 101 or the like. In other words, in such an improper attachment state, the camera CPU 221 and the grip CPU 222 may not communicate a camera=grip communication signal 213 via the second connectors 112A and 112B. As a result, for example, even when the user presses the release button 104 of the battery grip 101, the camera 100 cannot capture an image and the user may miss a photo opportunity. Accordingly, this embodiment detects that the camera 100 and the battery grip 101 are normally attached to each other, because the communication processing between camera CPU221 and grip CPU222 is not normally performed and a malfunction may occur. This embodiment is particularly effective where a large number of signals are communicated between the camera 100 and the battery grip 101 due to the sophisticated functions of the battery grip 101.

Figure 3:
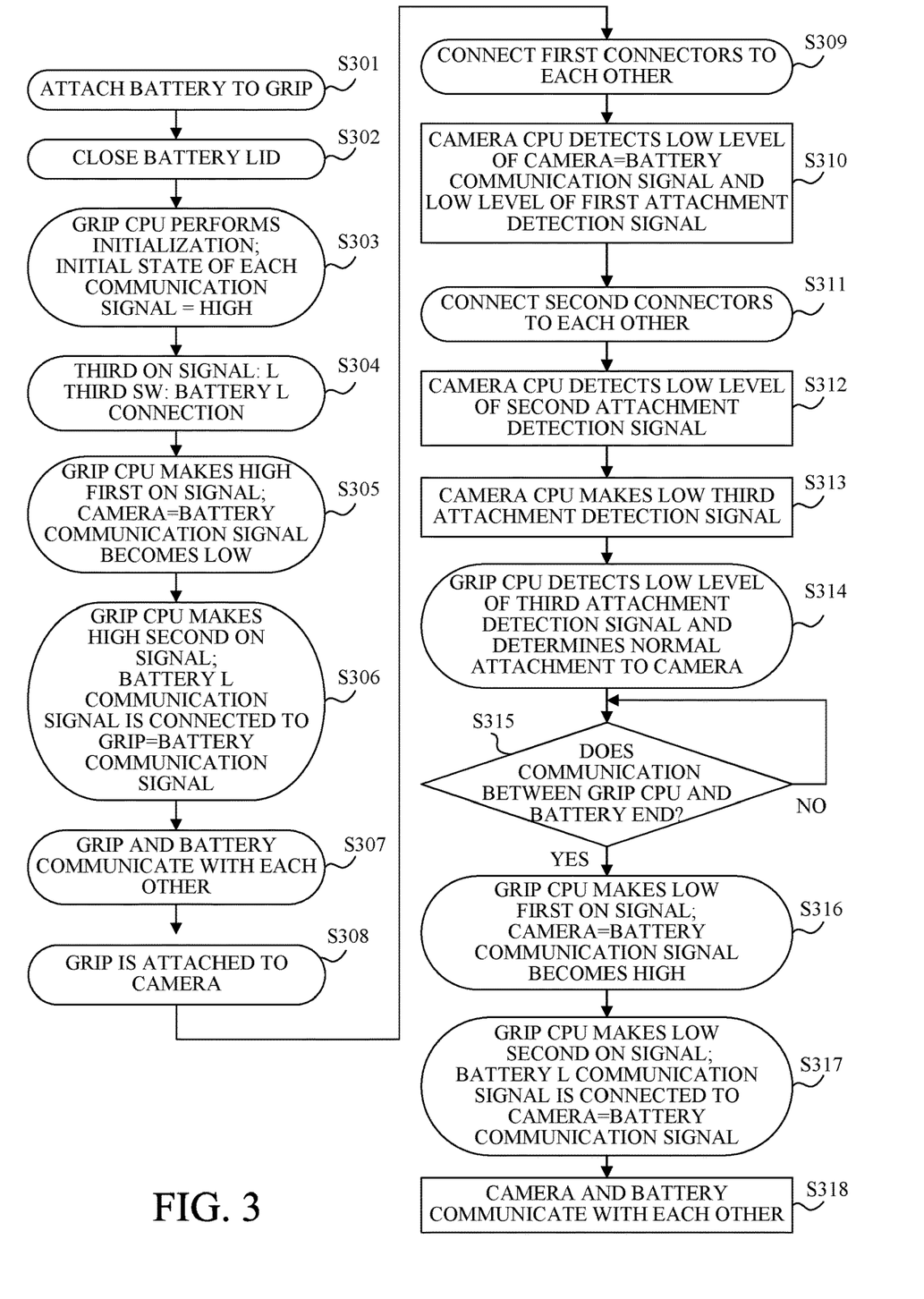
FIG. 3 is a flowchart showing a communication control where the image pickup apparatus and the accessory according to this embodiment are normally attached to each other.

Referring now to FIG. 3, a description will be given of a communication control where the camera 100 and the battery grip 101 according to this embodiment are normally attached to each other. FIG. 3 is a flowchart showing a communication control when the camera 100 and the battery grip 101 are normally attached to each other. Each step in FIG. 3 is mainly executed by the camera CPU 221 and the grip CPU 222.

First, in the step S301, a battery (batteries R 224 and L 225) is attached to the battery grip 101. Next, in the step S302, the battery lid of the battery grip 101 is closed. Next, in the step S303, the grip CPU 222 performs the initial setting (initialization). At this time, the initial state of each communication signal becomes high.

Next, in the step S304, the third ON signal 207 is set to low (L) in the initial setting, and the third SW 208 is connected to the battery L 225. Next, in the step S305, when the grip CPU 222 sets the first ON signal 202 to high, the camera=battery communication signal 201 becomes low. Next, in the step S306, the grip CPU 222 sets the second ON signal 205 to high. Thereby, the battery L communication signal 210 is connected to the grip=battery communication signal 204. Next, in the step S307, the grip CPU 222 communicates with the battery L 225.

Next, in the step S308, the battery grip 101 is attached to the camera 100. Next, in the step S309, the first connector 111A of the camera 100 and the first connector 111B of the battery grip 101 are attached (connected) to each other. Next, in the step S310, the camera CPU 221 detects that the camera=battery communication signal 201 has the low state. In other words, the camera CPU 221 detects that the first attachment detection signal 201a has the low state.

Next, in the step S311, the second connector 112A of the camera 100 and the second connector 112B of the battery grip 101 are attached (connected) to each other. Next, in the step S312, the camera CPU 221 detects that the second attachment detection signal 211 has the low state.

Next, in the step S313, the camera CPU 221 detects the low state of the first attachment detection signal 201a and the low state of the second attachment detection signal 211, and thus makes low the third attachment detection signal 212.

Next, in the step S314, the grip CPU 222 determines that the battery grip 101 is normally attached to the camera 100 by detecting that the third attachment detection signal 212 has the low state.

Next, in the step S315, the grip CPU 222 determines whether the communication between the grip CPU 222 and the battery L 225 has been completed. If the communication has been completed, the flow proceeds to step S316. On the other hand, if the communication has not been completed, it waits until the communication is completed.

In the step S316, the grip CPU 222 sets the first ON signal 202 to low. Thereby, the camera=battery communication signal 201 has a high level. Next, in the step S317, the grip CPU 222 makes low the second ON signal 205. Thereby, the battery L communication signal 210 is connected to the camera=battery communication signal 201. Next, in the step S318, the camera CPU 221 communicates with the battery L 225.

Figure 4:
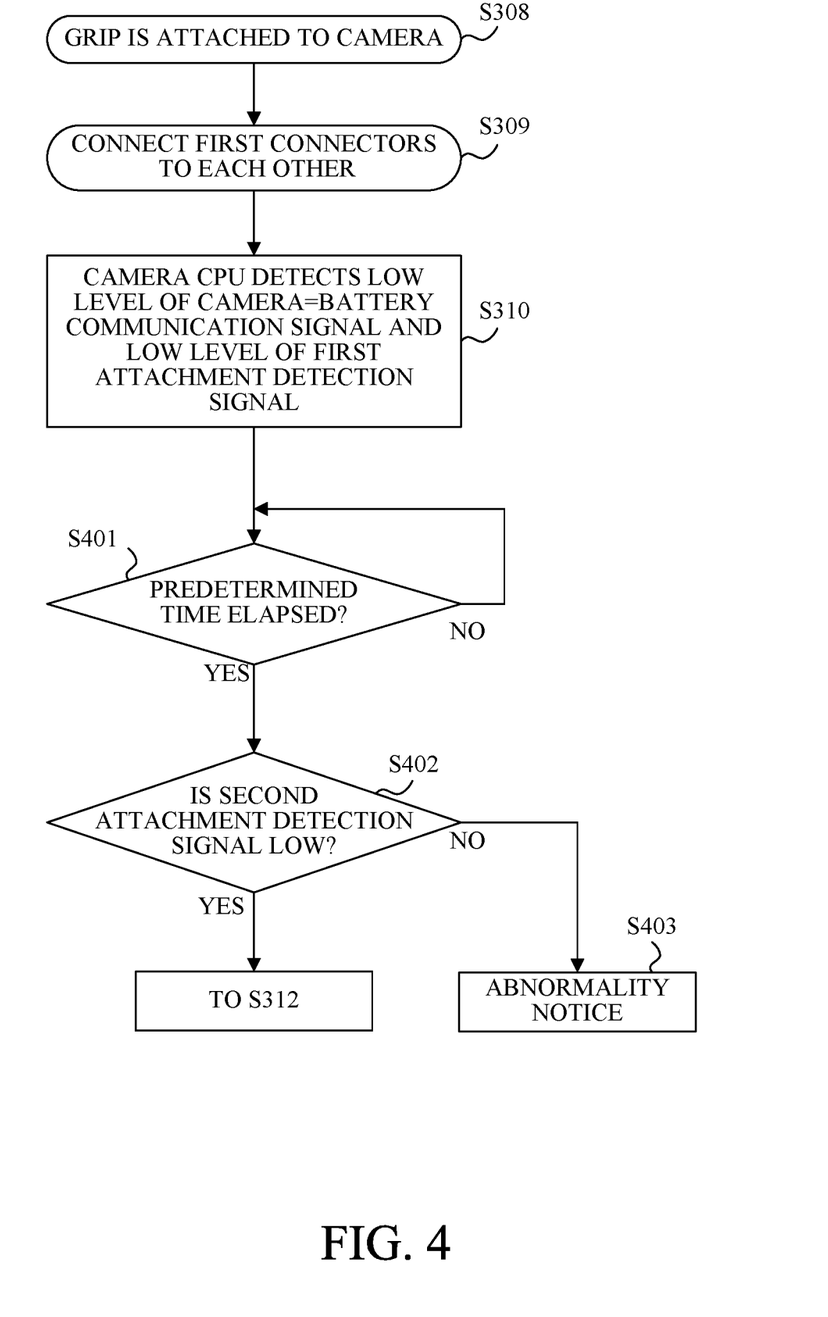
FIG. 4 is a flowchart showing a communication control where the image pickup apparatus and the accessory according to this embodiment are not normally attached to each other.

Referring now to FIG. 4, a description will be given of a communication control where the camera 100 and the battery grip 101 are not normally attached to each other. FIG. 4 is a flowchart showing a communication control when the second connector 112A of the camera 100 and the second connector 112B of the battery grip 101 are not normally connected to each other. Each step in FIG. 4 is mainly executed by the camera CPU 221 and the grip CPU 222.

The steps S308 to S310 in FIG. 4 are the same as those in FIG. 3. In the step S401, the camera CPU 221 determines whether or not a predetermined time has elapsed since the low state of the first attachment detection signal was detected. If the predetermined time has not elapsed, the determination in the step S401 is repeated. On the other hand, if the predetermined time has elapsed, the flow proceeds to the step S402.

In the step S402, the camera CPU 221 determines whether the second attachment detection signal 211 is low. If the second attachment detection signal 211 is low, the flow proceeds to the step S312 in FIG. 3. On the other hand, if the second attachment detection signal 211 is not low, the flow proceeds to the step S403. In the step S403, the camera CPU 221 determines that the second connector 112A of the camera 100 and the second connector 112B of the battery grip 101 are not normally connected, and issues an abnormality notice.

Figure 5:
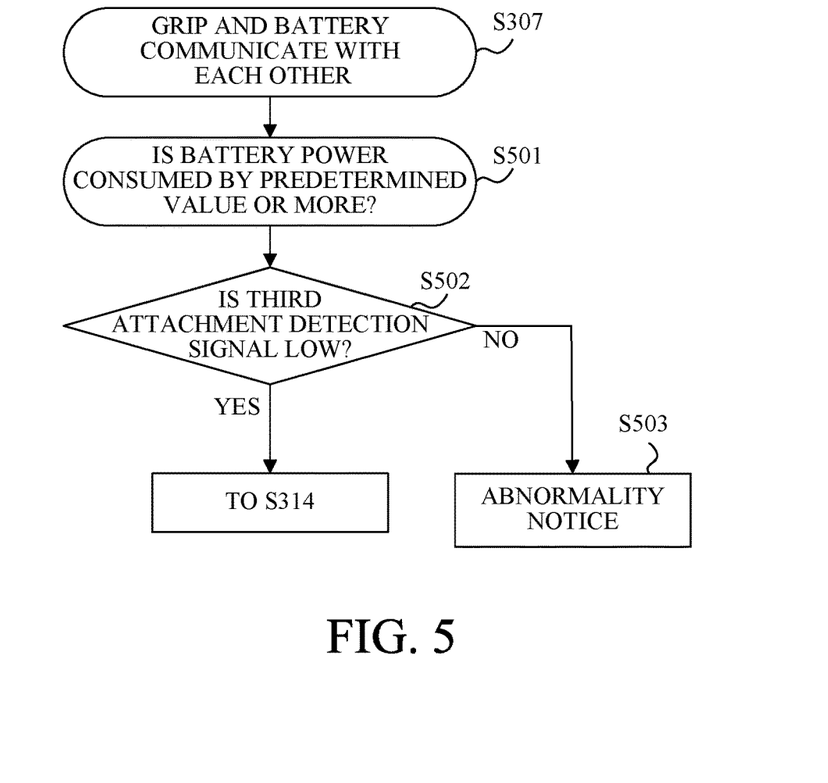
FIG. 5 is a flowchart showing a communication control where the image pickup apparatus and the accessory according to this embodiment are not normally attached to each other.

Referring now to FIG. 5, a description will be given of a communication control where the camera 100 and the battery grip 101 are not normally mounted. FIG. 5 is a flowchart showing a communication control when the second connector 112A of the camera 100 and the second connector 112B of the battery grip 101 are not normally connected. Each step in FIG. 5 is mainly executed by the camera CPU 221 and the grip CPU 222.

In FIG. 5, the step S307 is the same as that in FIG. 3. After the camera CPU 221 performs a communication between the grip and the battery in the step S307, the power of the battery L 225 is consumed by at least a predetermined value in the step S501. Next, in the step S502, the grip CPU 222 determines whether the third attachment detection signal 212 is low. If the third attachment detection signal 212 is low, the flow proceeds to the step S314 in FIG. 3. On the other hand, if the third attachment detection signal 212 is not low, the flow proceeds to step S503. In the step S503, the grip CPU 222 determines that the second connector 112A of the camera 100 and the second connector 112B of the battery grip 101 are not normally connected, and issues an abnormality notice.

Thus, the imaging system (camera system 10) according to this embodiment includes an image pickup apparatus (camera 100) and an accessory (battery grip 101) that is attachable to and detachable from the image pickup apparatus. The accessory includes the first connector 111B connectable to the image pickup apparatus, the second connector 112B connectable to the image pickup apparatus, and the accessory controller (grip CPU 222) configured to communicate with the image pickup apparatus. The accessory controller sends the first detection signal (first attachment detection signal 201a) to the image pickup apparatus via the first connector in the initial setting after the accessory is attached to the image pickup apparatus. The accessory controller receives, in response to a second detection signal (second attachment detection signal 211) for detecting that the second connector is attached to the image pickup apparatus, a third detection signal (third attachment detection signal 212) from the image pickup apparatus via the second connector.

When the accessory controller receives the third detection signal, the accessory controller may determine that the accessory is normally attached to the image pickup apparatus. On the other hand, when the accessory controller does not receive the third detection signal, the accessory controller may determine that the accessory is not normally attached to the image pickup apparatus. When the accessory controller has not received the third detection signal and the power of the battery (battery R 224 or L 225) inserted in the accessory is consumed by a predetermined value or more, the accessory controller may issue a notice of an abnormal state (S503).

The accessory controller may determine that it receives the third detection signal when the third detection signal has a low level (L). On the other hand, when the third detection signal has a high level (H), the accessory controller determines that it does not receive the third detection signal.

The first connector of the accessory may have a terminal 113B for communicating a first communication signal (camera=battery communication signal 201) between the battery inserted in the accessory and the image pickup apparatus. In the initial setting, the accessory controller may transmit a first detection signal to the image pickup apparatus via the terminal 113B. The accessory controller may send a first detection signal corresponding to a first communication signal having a predetermined level when the battery is inserted into the accessory and the battery lid of the accessory is closed.

When the battery is inserted into the accessory and the battery lid is closed, the accessory controller may set the first ON signal 202 to the high level, turn on the first switch (SW) 203, and sets the first communication signal to the low level (L). The accessory controller may set the first communication signal to the low level, then switch the second switch (SW) 206, and communicate the second communication signal (grip=battery communication signal 204) with the battery. The accessory controller may control the second switch so as to enable a communication between the image pickup apparatus and the battery when it receives the third detection signal and the communication of the second communication signal is completed (S316 to S318).

When the accessory is attached to the image pickup apparatus, the first connector may be attached to the image pickup apparatus and then the second connector may be attached to the image pickup apparatus. The accessory may be a battery grip 101, and the battery grip may include a body portion 102 into which the battery is inserted, and a protrusion portion 103 attached to a battery compartment of the image pickup apparatus. The first connector may be provided onto the protrusion portion, and the second connector may be provided onto the body portion.

According to this embodiment, the image pickup apparatus includes a first connector 111A connectable to the accessory, a second connector 112A connectable to the accessory, and a camera controller (camera CPU 221) configured to communicate with the accessory. The camera controller receives the first detection signal (first attachment detection signal 201a) from the accessory via the first connector in the initial setting after the accessory is attached to the image pickup apparatus. When the second connector is attached to the accessory, the camera controller receives the second detection signal (second attachment detection signal 211). When the camera controller receives the first detection signal and the second detection signal, the camera controller sends the third detection signal (third attachment detection signal 212) via the second connector.

When the camera controller receives the first detection signal and the second detection signal, the camera controller may determine that the accessory is normally attached to the image pickup apparatus. On the other hand, when the camera controller does not receive at least one of the first detection signal and the second detection signal, the camera controller may determine that the accessory is not normally attached to the image pickup apparatus. If the camera controller has not received the second detection signal for a predetermined time since the camera controller received the first detection signal, the camera controller issues a notice of an abnormal state (S403).

The first connector of the image pickup apparatus may have a terminal 113A for communicating a first communication signal (camera=battery communication signal 201) between the battery inserted in the accessory and the image pickup apparatus. The camera controller may receive the first detection signal from the accessory via the terminal 113A in the initial setting.

When the accessory is attached to the image pickup apparatus via the first connector, the camera controller may receive the first detection signal corresponding to the first communication signal having a predetermined level. The first detection signal may correspond to the first communication signal at a low level (L).

This embodiment can provide an accessory and an image pickup apparatus that can avoid a malfunction where part of the connectors is not connected.

This embodiment describes the use in the image pickup apparatus and the battery grip, but is not limited to this example. The present invention is applicable to devices in other fields as long as the two devices including the electronic apparatus and the accessory are attachable and connectable to each other and the power connector and the communication connector are separately provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-108221, filed on Jun. 6, 2018, which is hereby incorporated by reference herein in its entirety.

What is claimed is:

1. An accessory attachable to and detachable from an image pickup apparatus, the accessory comprising:
   a first connector connectable to the image pickup apparatus;

a second connector connectable to the image pickup apparatus; and an accessory controller configured to communicate with the image pickup apparatus, wherein the accessory controller, in an initial setting after the accessory is attached to the image pickup apparatus, sends a first detection signal to the image pickup apparatus via the first connector and receives, in response to a second detection signal for detecting that the second connector is attached to the image pickup apparatus, a third detection signal from the image pickup apparatus via the second connector.

2. The accessory according to claim 1, wherein the accessory controller determines that the accessory is normally attached to the image pickup apparatus when receiving the third detection signal, and that the accessory is not normally attached to the image pickup apparatus when not receiving the third detection signal.

3. The accessory according to claim 2, wherein the accessory controller issues a notice of an abnormal state when the accessory controller does not receive the third detection signal and when a battery power inserted in the accessory is consumed by a predetermined value or more.

4. The accessory according to claim 1, wherein the accessory controller determines that the accessory controller receives the third detection signal when the third detection signal has a low level, and that the accessory controller does not receive the third detection signal when the third detection signal has a high level.

5. The accessory according to claim 1, wherein the first connector includes a terminal configured to communicate a first communication signal between a battery inserted in the accessory and the image pickup apparatus, and wherein the accessory controller sends the first detection signal to the image pickup apparatus via the terminal in the initial setting.

6. The accessory according to claim 5, wherein the accessory controller sends the first detection signal corresponding to the first communication signal having a predetermined level when the battery is inserted into the accessory and a battery lid of the accessory is closed.

7. The accessory according to claim 6, wherein the accessory controller sets a first ON signal to a high level, turns on a first switch, and sets the first communication signal to a low level, when the battery is inserted into the accessory and the battery lid is closed.

8. The accessory according to claim 7, wherein the accessory controller communicates a second communication signal with the battery by switching a second switch after setting the first communication signal to the low level.

9. The accessory according to claim 8, wherein the accessory controller controls the second switch so as to enable a communication between the image pickup apparatus and the battery when the accessory controller receives the third detection signal and a communication of the second communication signal is completed.

10. The accessory according to claim 1, wherein when the accessory is attached to the image pickup apparatus, the first connector is attached to the image pickup apparatus and then the second connector is attached to the image pickup apparatus.

11. The accessory according to claim 1, wherein the accessory is a battery grip that includes a body portion into which a battery is inserted, and a protrusion portion attachable to a battery compartment in the image pickup apparatus, and wherein the first connector is provided to the protrusion portion, and the second connector is provided to the body.

12. An image pickup apparatus to which an accessory is detachably attachable, the image pickup apparatus comprising:

a first connector connectable to the accessory;

a second connector connectable to the accessory; and a camera controller communicating with the accessory, wherein the camera controller, in an initial setting after the accessory is attached to the image pickup apparatus, receives a first detection signal from the accessory via the first connector, receives a second detection signal when the second connector is attached to the accessory, and sends a third detection signal through the second connector after receiving the first detection signal and the second detection signal.

13. An accessory attachable to and detachable from an electronic apparatus, the accessory comprising:

a first connector connectable to the electronic apparatus;

a second connector connectable to the electronic apparatus; and an accessory controller configured to communicate with the electronic apparatus, wherein the accessory controller, in an initial setting after the accessory is attached to the electronic apparatus, sends a first detection signal to the electronic apparatus via the first connector and receives, in response to a second detection signal for detecting that the second connector is attached to the electronic apparatus, a third detection signal from the electronic apparatus via the second connector.

14. The accessory according to claim 13, wherein the accessory controller determines that the accessory controller receives the third detection signal when the third detection signal has a low level, and that the accessory controller does not receive the third detection signal when the third detection signal has a high level.

15. The accessory according to claim 13, wherein the first connector includes a terminal configured to communicate a first communication signal between a battery inserted in the accessory and the electronic apparatus, and wherein the accessory controller sends the first detection signal to the electronic apparatus via the terminal in the initial setting.

16. The accessory according to claim 15, wherein the accessory controller sends the first detection signal corresponding to the first communication signal having a predetermined level when the battery is inserted into the accessory and a battery lid of the accessory is closed.

17. The accessory according to claim 16, wherein the accessory controller sets a first ON signal to a high level, turns on a first switch, and sets the first communication signal to a low level, when the battery is inserted into the accessory and the battery lid is closed.

18. The accessory according to claim 17, wherein the accessory controller communicates a second communication signal with the battery by switching a second switch after setting the first communication signal to the low level.

19. The accessory according to claim 18, wherein the accessory controller controls the second switch so as to enable a communication between the electronic apparatus and the battery when the accessory controller receives the third detection signal and a communication of the second communication signal is completed.

* * * * *